(12) United States Patent
Taylor

(10) Patent No.: US 11,132,606 B2
(45) Date of Patent: Sep. 28, 2021

(54) REINFORCEMENT LEARNING TO TRAIN A CHARACTER USING DISPARATE TARGET ANIMATION DATA

(71) Applicant: Sony Interactive Entertainment Inc., Tokyo (JP)

(72) Inventor: Michael Taylor, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 371 days.

(21) Appl. No.: 16/355,680

(22) Filed: Mar. 15, 2019

(65) Prior Publication Data
US 2020/0293881 A1 Sep. 17, 2020

(51) Int. Cl.
G06N 3/08 (2006.01)
G06T 13/40 (2011.01)
G06T 13/80 (2011.01)

(52) U.S. Cl.
CPC ............. *G06N 3/08* (2013.01); *G06T 13/40* (2013.01); *G06T 13/80* (2013.01)

(58) Field of Classification Search
CPC ...................................................... G06F 15/18
See application file for complete search history.

(56) References Cited

U.S. PATENT DOCUMENTS

| 6,088,042 A * | 7/2000 | Handelman ............. G06T 13/40 345/473 |
| 2014/0274373 A1 * | 9/2014 | Olshan .................... A63F 13/65 463/31 |
| 2018/0225858 A1 * | 8/2018 | Ni ............................ G06T 17/20 |
| 2018/0374251 A1 * | 12/2018 | Mitchell ................. G06T 13/40 |
| 2019/0295305 A1 * | 9/2019 | Yang ....................... G06N 3/088 |
| 2019/0339766 A1 * | 11/2019 | Erivantcev ........... G06K 9/6271 |
| 2019/0340419 A1 * | 11/2019 | Milman .................. G06T 15/02 |
| 2019/0340803 A1 * | 11/2019 | Comer .................... G06T 13/40 |

(Continued)

OTHER PUBLICATIONS

Xue Bin Peng et al, "DeepMimic: Example-Guided Deep Reinforcement Learning of Physics-Based Character Skills", arxiv.org, Cornell University Library, 201 Olin Library Cornell University Ithaca, NY 14853, Apr. 8, 2018 (Apr. 8, 2018), XP081240560, sections 3, 5.3, 7, 10.2, 10.3.

(Continued)

*Primary Examiner* — Olisa Anwah
(74) *Attorney, Agent, or Firm* — Penilla IP, APC

(57) ABSTRACT

A method for training an animation character, including mapping first animation data defining a first motion sequence to a first subset of bones of a trained character, and mapping second animation data defining a second motion sequence to a second subset of bones. A bone hierarchy includes the first subset of bones and second subset of bones. Reinforcement learning is applied iteratively for training the first subset of bones using the first animation data and for training the second subset of bones using the second animation data. Training of each subset of bones is performed concurrently at each iteration. Training includes adjusting orientations of bones. The first subset of bones is composited with the second subset of bones at each iteration by applying physics parameters of a simulation environment to the adjusted orientations of bones in the first and second subset of bones.

20 Claims, 9 Drawing Sheets

(56) References Cited

U.S. PATENT DOCUMENTS

2020/0005138 A1* 1/2020 Wedig .................. G06N 3/0481

OTHER PUBLICATIONS

Ko-Yun Liu et al, "A framework for locally retargeting and rederiing facial performance", Computer Animation and Virtual Worlds, Apr. 1, 2011 (Apr. 1, 2011), pp. 159-167, XP055689533, Chichester, UK DOI: 10.1002/cavA04, Retrieved from the Internet: URL:https://ict.usc.edu/pubs/A%20Framework%for%20Facial1%Performance.pdf, Sections 1, 3.2, 3.2.1, 3.2.2, 4, 6, 7.
International Search Report and Written Opinion, PCT/US2020/017059, dated May 18, 2020, 12 pages.

* cited by examiner

REINFORCEMENT LEARNING TO TRAIN A CHARACTER USING DISPARATE TARGET ANIMATION DATA

TECHNICAL FIELD

The present disclosure is related to animating characters, and more specifically to training different parts of an animation character using disparate target animation data, each of the target animation data including a corresponding motion sequence.

BACKGROUND OF THE DISCLOSURE

Animated characters are used in video gaming. An animated character may include a skeleton of interconnected bones that may impart movement of the animated character through the movement and positioning of the interconnected bones. Once the skeleton is generated, that same skeleton may be used to create any type of motion. A skin or mesh may be overlaid the skeleton to provide a visual representation of the character that is viewable within a corresponding video game.

Building an animated character from scratch is time consuming and computationally expensive. As such, various techniques have been employed to reduce the amount of work and time involved in creating new characters. Simplistically, one skeleton may be reused to animate a multitude of characters in one or more video games, wherein each character may have a different mesh or skin. However, because the same skeleton is used all of the characters ultimately will generally look alike (e.g., same size, etc.) and have the same movements, even though the skins may be different.

Another technique may take the motion from a base character, and apply that motion to a new character while adjusting for different proportions between characters. For example, motion retargeting may be employed to transform the motion to the new character. In that manner, the transformed motion may be customized to the new character and may look different than the motion of the base character. In general, motion retargeting uses joint manipulation to generate the transformed motion through an iterative process. However, motion retargeting is still time consuming and computationally expensive when manipulating joints. Also, motion retargeting may fail when the new character is vastly different than the base character.

It is in this context that embodiments of the disclosure arise.

SUMMARY

Embodiments of the present disclosure relate to systems and methods for limb mapping using reinforcement learning for a specific animation character. In particular, the animation character is trained with reinforcement learning using multiple target animation data. Each animation data is directed to a different portion of the body of the animation character, such as to a different subset of a bone hierarchy (e.g., skeleton, rig, etc.). Each animation data may have a different motion sequence, such that the motion sequences include disparate motions that may not be associated with each other. The compositing and training of the animation character using the target animation data is for a specific simulation environment.

In one embodiment, a method for training an animation character for use in animation is disclosed. The method includes mapping first animation data to a first subset of bones of a trained character. The first animation data defines a first target motion sequence. The method includes mapping second animation data to a second subset of bones of the trained character. The second animation data defines a second target motion sequence. A bone hierarchy of the trained character includes the first subset of bones and second subset of bones. The method includes applying reinforcement learning over a plurality of iterations for training the first subset of bones using the first animation data and for training the second subset of bones using the second animation data. Training of each subset of bones is performed concurrently at each iteration. Training the first and second subset of bones includes adjusting orientations of bones in the first and second subset of bones. The first subset of bones is composited with the second subset of bones at each iteration of reinforcement learning by applying physics parameters of a simulation environment to the adjusted orientations of bones in the first and second subset of bones.

In another embodiment, a non-transitory computer-readable medium storing a computer program for training an animation character for use in animation is disclosed. The computer-readable medium includes program instructions for mapping first animation data to a first subset of bones of a trained character. The first animation data defines a first target motion sequence. The computer-readable medium includes program instructions for mapping second animation data to a second subset of bones of the trained character. The second animation data defines a second target motion sequence. A bone hierarchy of the trained character includes the first subset of bones and second subset of bones. The computer-readable medium includes program instructions for applying reinforcement learning over a plurality of iterations for training the first subset of bones using the first animation data and for training the second subset of bones using the second animation data. Training of each subset of bones is performed concurrently at each iteration. Training the first and second subset of bones includes adjusting orientations of bones in the first and second subset of bones. The first subset of bones is composited with the second subset of bones at each iteration of reinforcement learning by applying physics parameters of a simulation environment to the adjusted orientations of bones in the first and second subset of bones.

In still another embodiment, a computer system is disclosed, wherein the computer system includes a processor and memory coupled to the processor and having stored therein instructions that, if executed by the computer system, cause the computer system to execute a method for training an animation character for use in animation is disclosed. The method as executed by the computer system includes mapping first animation data to a first subset of bones of a trained character. The first animation data defines a first target motion sequence. The method includes mapping second animation data to a second subset of bones of the trained character. The second animation data defines a second target motion sequence. A bone hierarchy of the trained character includes the first subset of bones and second subset of bones. The method includes applying reinforcement learning over a plurality of iterations for training the first subset of bones using the first animation data and for training the second subset of bones using the second animation data. Training of each subset of bones is performed concurrently at each iteration. Training the first and second subset of bones includes adjusting orientations of bones in the first and second subset of bones. The first subset of bones is composited with the second subset of bones at each iteration of reinforcement learning by applying physics parameters of a simulation environment to the adjusted orientations of bones in the first and second subset of bones.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to train limbs of an animation character using disparate body motions from two or more animation data. Specifically, the animation character is trained with reinforcement learning using multiple target animation data, each of which is directed to a different portion of the body of the animation character, such as to a different subset of a bone hierarchy (e.g., skeleton, rig, etc.). For example, the target animation data may include motion capture data, developed animation data, etc. Each target animation data may have a different target motion sequence, such that the motion sequences include disparate motions that may not be associated with each other. The compositing and training of the animation character using the target animation data is for a specific simulation environment.

With the above general understanding of the various embodiments, example details of the embodiments will now be described with reference to the various drawings.

Figure 1A:
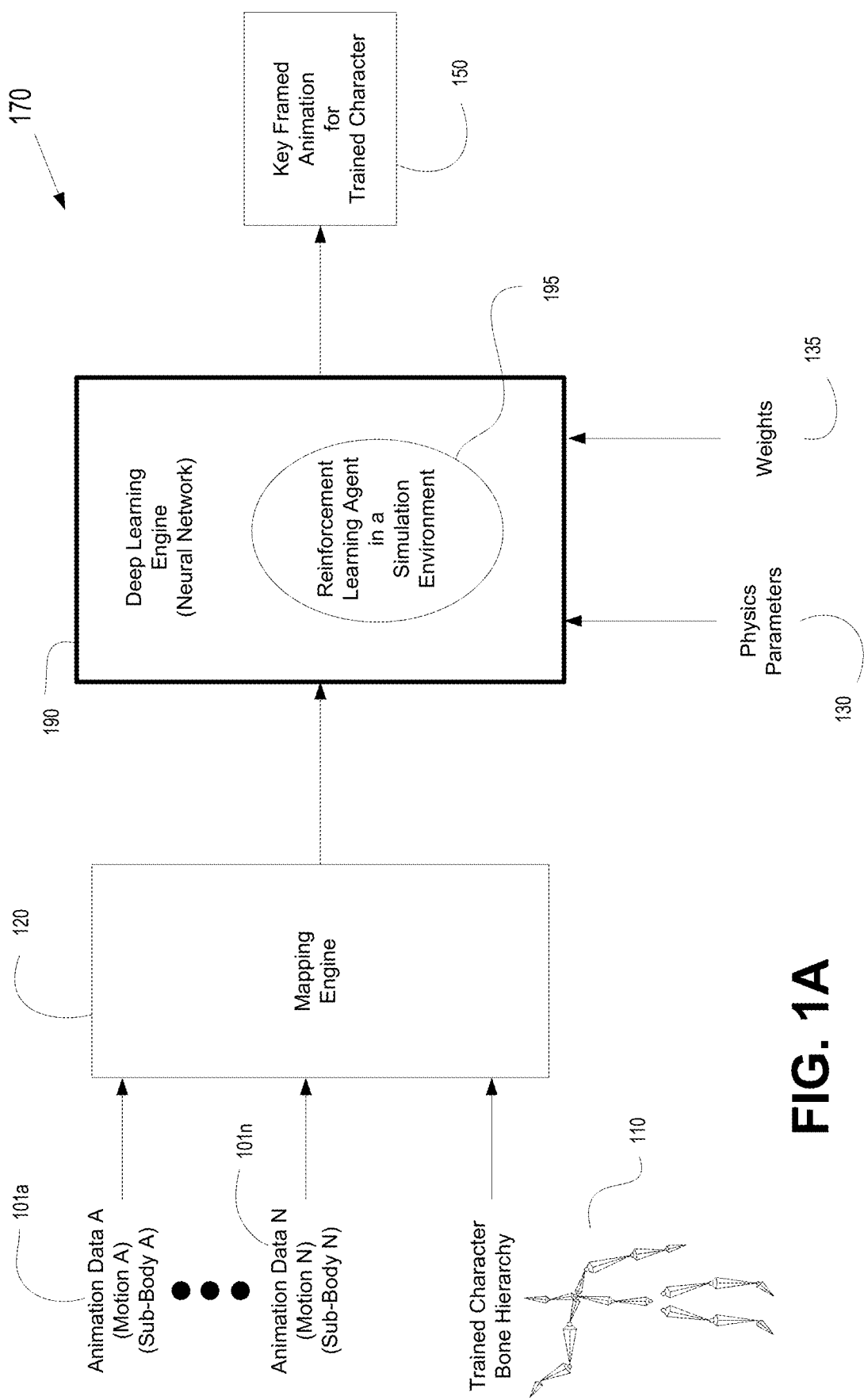
FIG. 1A is a system diagram for training an animation character with reinforcement learning using two or more target animation data having disparate target body motions, in accordance with one embodiment of the present disclosure.

FIG. 1A is a system diagram for training an animation character 100 with reinforcement learning using two or more target animation data 101 having disparate target body motions, in accordance with one embodiment of the present disclosure. In particular, mapping engine 120 receives as input a plurality of target animation data 101 (e.g., one or more target animation data, two or more target animation data, etc.). For example target animation data A (101a) includes target body motion A that may be directed to sub-body A of the trained animation character. Other target animation data may also be input, such as second target animation data including target body motion B that may be directed to sub-body B of the trained animation character. In embodiments, two or more separate target animation data is provided as input, to include target animation data N (101n), which includes target body motion N that may be directed to sub-body N of the trained animation character 100.

With multiple target animation data, each of the target animation data (e.g., 101a through 101n) may be directed to a different part of the trained animation character 100, in one embodiment. For example, the trained animation character 100 may be associated with a bone hierarchy 110, which is provided as input to the mapping engine 120. As such, each target animation data includes a sub-bone hierarchy which corresponds to a portion or subset of the bone hierarchy 110. For example, in a two target animation data training of the trained animation character 100, animation data A 101a may be directed to the arms and torso of a target character, which can be mapped to the arms and torso of the bone hierarchy 110 of the trained animation character 100. Also, animation data B 101b may be directed to the legs and waist of a corresponding target character, which can be mapped to the legs and waist of the bone hierarchy 110 of the trained animation character 100.

Using two separate target animation data is exemplary, and is used throughout the specification for clarity and brevity. Embodiments of the present disclosure disclose the use of two or more separate target animation data having disparate body motions to train the limbs and/or bones of the trained animation character 100. For illustration purposes only, the trained animation character 100 may be of human form, in one embodiment. For example, one target animation data may be to the right hand, another target animation data may be to the left hand, another target animation data may be to the head, still another target animation data may be to the left arm, etc. That is, each target animation data may be directed to a unique subset of bones of the bone hierarchy 110 of the trained animation character 100.

In addition, each of the target animation data may be taken from different target animation characters. Each target animation character may have unique limb and/or proportions and limb and/or bone structures. As such, the bone hierarchy 110 of the trained animation character 100 may be based on the target bone hierarchies (e.g., sub-bone hierarchies) of the target animation characters. In that manner, the mapping engine 120 may map portions of the target sub-bone hierarchies associated with the target animation data to the bone hierarchy 110 of the trained animation character 100. In one embodiment, the trained animation character 100 has a humanoid form. In other embodiments, the trained animation character may take on other forms, such as those of animals, or newly designed characters, or a mix of two or more animation characters (e.g., centaur, etc.). In that manner, any number of animation characters may be created, limited only to the imagination of the developer.

Animation data may be any information used to animate digital character models used in computer animation (e.g., video gaming, simulations, etc) Animation data may include motion capture (MOCAP) data that is generated by capturing through various techniques body motions of human actors, which is then used to animate a corresponding animation character. Still other animation data is supported.

As shown in FIG. 1A, the plurality of target animation data 101 and the bone hierarchy 110 is provided as input to the deep learning engine 190 which applies reinforcement learning through reinforcement learning agent 195 to train the animation character 100 using the target body motions of the target animation data 101. The deep learning engine 190 receives as input physics parameters 130 of a simulation environment 310 (e.g., environment of the video game) to blend the disparate body motions from the plurality of target animation data 101 so that the movement of the trained animation character 100 looks realistic. The physics parameters define various physical characteristics of the simulation environment, such as gravity (e.g., whether on earth or another space object), etc. The movement of the trained animation character 100 is provided as output from the deep learning engine 190 as key framed animation 150.

In addition, weights 135 may be applied during the application of reinforcement learning through reinforcement learning agent 195 of the deep learning engine 190 in order to favor one animation data over another animation data. For example, in the case of using two separate target animation data to train a humanoid animation character 100, the first target animation data 101*a* may be directed to the upper part of the humanoid including the arms and torso. The target body motion of the first target animation data 101*a* may be a waving motion of the target character, wherein the target character may be standing. The second target animation data 101*b* may be directed to the lower part of the humanoid animation character 100 including the waist region and the legs, wherein the target character may be running. Weights may be applied in such a manner that the second target animation data 101*b* is favored over the first target animation data 101*a*, such that the trained animation character 100 will favor the running body motion over the waving body motion especially after applying the physics parameters of the simulation environment 310. For instance, it may be physically difficult to both wave and run at the same time in the simulation environment 310. The application of the weights 135 favors the running motion over the waving motion, such that the trained animation character 100 will have a running motion close to the target running motion, and a stunted waving motion in order to comply with the physics parameters 130 of the simulation environment 310. In that manner, the blended motions of the trained animation character 100 will look realistic for the simulation environment 310.

Figure 1B:
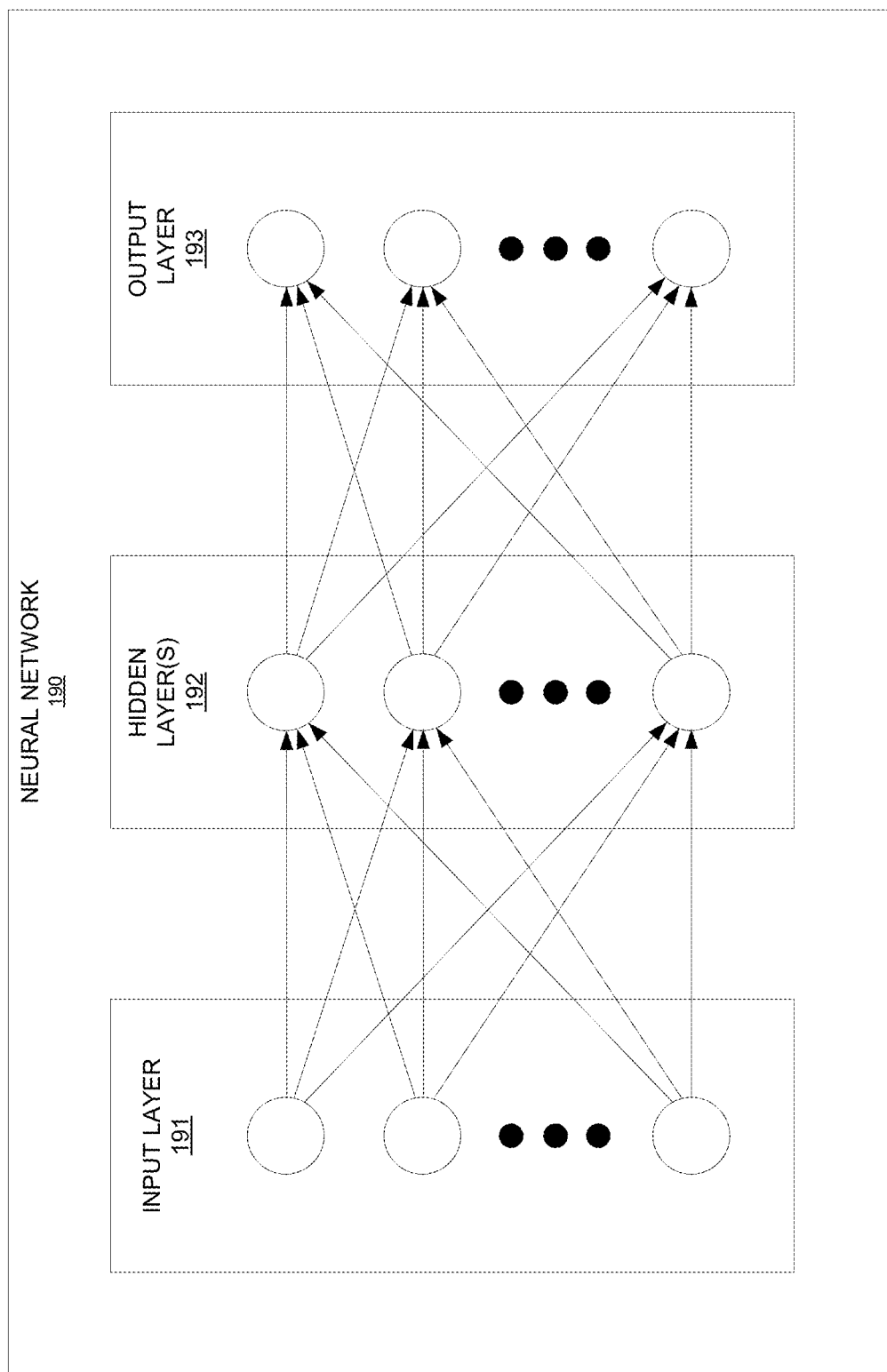
FIG. 1B illustrates an example neural network used to build an AI model, in accordance with one embodiment of the present disclosure.
Figure 2:
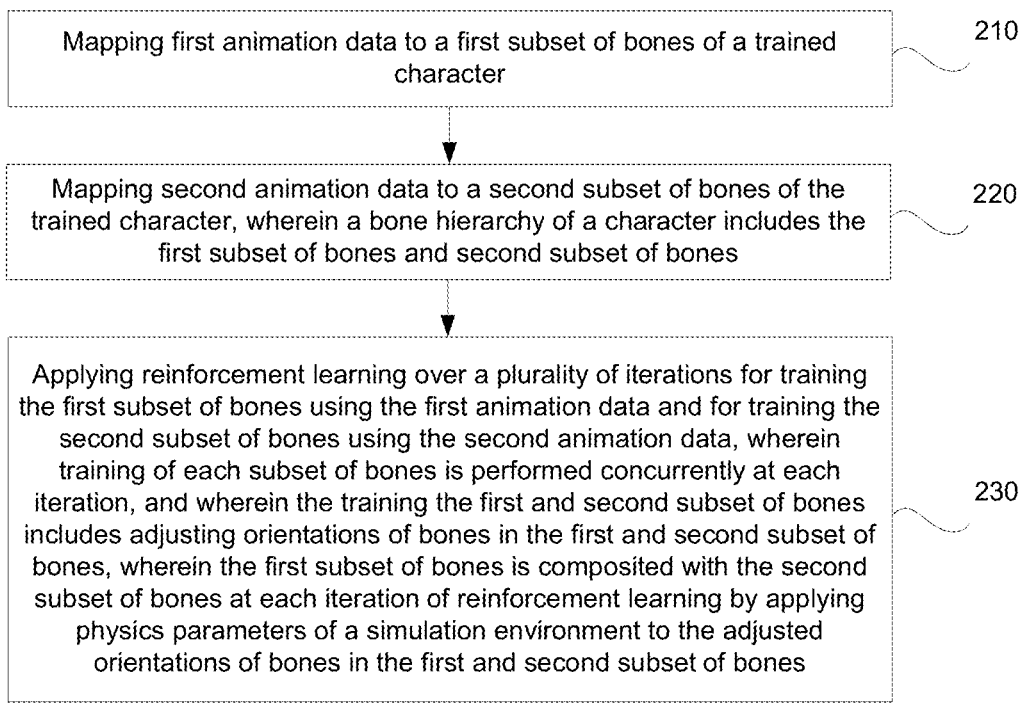
FIG. 2 is a flow diagram illustrating a method for training an animation character with reinforcement learning using two or more target animation data having disparate target body motions, in accordance with one embodiment of the present disclosure.

FIG. 1B illustrates an example neural network 190 (e.g., deep learning engine) used to train limbs and/or bones of an animation character using target animation data having disparate body motions, as previously introduced. In that manner, given as input target animation data (e.g., one or more target animation data, two or more target animation data), reinforcement learning may be applied by the reinforcement learning agent 195 of the neural network 190 to train limbs of a trained animation character in a specific simulation environment. In that manner, a digital animation character may be generated using previously defined target animation data of target animation characters. More specifically, disparate target motions of the target animation characters may be blended together during training to generate final movement for the trained animation character 100, wherein the target motions may be directed to different portions of the bone hierarchy 110 of the trained animation character 100 (e.g., upper body waving and lower body running) During blending of the target motions of the target animation characters, the movement of the trained animation character 100 follows the physics parameters of the simulation environment 310, and weighting of the animation data, in embodiments.

More particularly, the training of the trained character 100 is implemented by the deep learning engine 190, in accordance with one embodiment of the present disclosure. The deep learning engine 190 utilizes artificial intelligence, including deep learning algorithms, reinforcement learning, or other artificial intelligence-based algorithms to train the animation character. The neural network 190 may be implemented at one or more server devices, in one embodiment. Each of the server devices may have one or more cores for parallel computing. In that manner, the multiple cores may be configured for parallel computing to solve problems with reinforcement learning in highly stochastic environments. Parallelization works to stabilize the reinforcement learning algorithm applied by the deep learning engine (e.g., de-correlates updates), in one embodiment. In another embodiment, parallelization reduces non-stationarity of observed data. In still another embodiment, parallelization increases explorations of the parameter space during reinforcement learning (e.g., helps avoids local minimums).

More particularly, during the learning phase, reinforcement learning is applied by reinforcement learning agent 195 to train the deep learning engine 190 to control joint parameters (e.g., angle, position, etc.) of the bone hierarchy 110 of the trained animation character in a simulation environment based on bone orientations. The joint parameters are automatically determined for bone orientations determined through reinforcement learning. For example, working with bone orientations for bones in the bone hierarchy 110, reinforcement learning determines a distance metric of a trained orientation of a bone from a target orientation of that bone based on animation data for a given frame within a motion sequence. That distance metric may be a reward that is used in later loops and/or iterations of the reinforcement learning, wherein reinforcement learning is configured to reduce that distance metric, in one embodiment, wherein bone orientations in association with the distance metric may be further constrained with physics parameters of the simulation environment 310 and/or weights.

The neural network 190 represents an example of an automated analysis and/or learning tool for analyzing data sets to train one or more subsets of limbs and/or bones of a trained animation character using animation data having disparate body motions. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning, or rewards based learning (e.g., through the use of success criteria, success metrics, distance metrics, etc.), incremental learning, etc. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to bone orientations of a target motion.

At the highest hierarchical level, an output layer 193 exists. The output layer 193 includes a set of output nodes. An output node represents a decision (e.g., action, prediction, prediction of success of a game play for a given set of input data, etc.) that relates to one or more components of a trained AI model 160, for example. As previously described, the output nodes may identify the learned bone orientations for a bone hierarchy of the trained animation character for a given set of inputs. These results can be compared to predetermined and true results, or learned actions and results, as obtained from the previous iterations of learning to iteratively determine the appropriate bone orientations for a given set of inputs.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

In one embodiment, hidden layer 192 may include three hidden layers within the neural network 190, wherein each hidden layer may have 128 neurons. The neural network 190 may also include an input layer 191 and an output layer 193, as previously described. As such, there may be greater than 47 thousand neurons in the neural network 190 used to train the animation character 100 using two or more target animation data having disparate body motions.

Generally, the hidden layer 192 allows knowledge about the input nodes to be shared among all the tasks corresponding to the output nodes. To do so, a transformation f is applied to the input nodes through the hidden layer 192, in one implementation. In an example, the transformation f is non-linear. Different non-linear transformations f are available including, for instance, a rectifier function $f(x)=\max(0, x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the bone orientations and corresponding joint parameters to be performed to animate a bone hierarchy 110 of a trained character 100 for a given set of inputs or input data (e.g., two or more target animation data). In this illustration, the data domain includes target animation data, to include one or more target animation data, two or more animation data, etc. The target animation data represents disparate body motions for different portions of the bone hierarchy of the trained animation character. In another example, the training dataset is from different data domains to include input data other than baseline.

As such, the neural network 190 may learn the motion of the trained animation character 100 by blending the disparate body motions defined by the target animation data.

With the detailed description of the various modules of the system 170, flow diagram 200A discloses a method for training an animation model with reinforcement learning and using two or more animation data representing disparate body motions, in accordance with one embodiment of the present disclosure. Flow diagram 200A may be implemented within a server system implementing a deep learning engine 190, previously described.

Specifically, at 210, the method includes mapping first target animation data to a first subset of bones of a trained animation character. In an initial state, the first subset of bones may be in a reference state (e.g., standing, resting, etc.) key frame to key frame, such that there is no motion throughout a motion sequence. The first target animation data represents a first target motion sequence of a target character that can be mapped to and used for training a specific portion of the body of the trained animation character. That specific portion corresponds to the first subset of bones in a bone hierarchy of the trained animation character. For illustration purposes, the first target animation data may be the upper portion of a first target character (e.g., bones of arms and torso), which is mapped to the upper portion of the body of the trained character (e.g., the upper portion of the bone hierarchy). The target motion sequence represented by the first animation data may be arms of the upper portion of the target character waving. The first target animation data is used to train the first subset of bones of the trained character, such that the upper portion of the bone hierarchy of the trained character learns the target motion of the second target character, such as learning to wave.

At 220, the method includes mapping second target animation data to a second subset of bones of the trained animation character. In an initial state, the first subset of bones may be in a reference state (e.g., standing, resting, etc.) key frame to key frame, such that there is no motion throughout a motion sequence. The second target animation data represents a second motion sequence for a specific portion of the body of the trained animation character. That specific portion corresponds to the second subset of bones in a bone hierarchy of the trained animation character. For illustration purposes, continuing the example of using two separate target animation data to train an animation character (e.g., humanoid), the second target animation data may be the lower portion of a second target character (e.g., bones of the waist and legs), which is mapped to the lower portion of the body of the trained character (e.g., the lower portion of the bone hierarchy). The target motion sequence represented by the second animation data may be the legs of the lower portion of the target character in a running motion. The second target animation data is used to train the second subset of bones of the trained character, such that the lower portion of the bone hierarchy of the trained character learns the target motion of the second target character, such as learning to run.

At 230, the method includes applying reinforcement learning over a plurality of iterations for training the first subset of bones using the first target animation data and for training the second subset of bones using the second animation data. In particular, the first target animation data is used to train the first subset of bones, wherein orientations of bones in the first subset of bones are adjusted during training. Also, the second target animation data is used to train the second subset of bones, wherein orientations of bones in the second subset of bones are adjusted during training. In one embodiment, training of each subset of bones is performed concurrently at each iteration of reinforcement learning. In addition, training of the first and second subset of bones includes adjusting orientations of bones in the first and second subset of bones. Once an orientation of a corresponding bone is known, the appropriate joint parameters for that bone can be automatically determined as applied through the deep learning engine, or another processing server. That is, joint parameters of a plurality of joints of the bones in the hierarchy of bones are automatically adjusted in response to the adjusted orientations in the first and second subset of bones. Specifically, the trained character in simulation is driven through joint motors, where a motor can be operated by specifying either a position (to move to), a velocity, or a torque. As described, in one embodiment, positions (e.g., bone orientations) are used to drive the motor. The neural network outputs a set of actions in the form of a position for each joint (e.g., based on the adjusted bone orientations), which causes the joint motor to respond and the trained character to move.

In particular, at each iteration of reinforcement learning the orientations of the bones in the first subset are adjusted according to corresponding reward metrics. This is accomplished key frame by key frame through the entire motion sequence. For example, the reward metric may be a distance metric (e.g., quaternion distance) between the trained orientation (e.g., associated with the current iteration) of a corresponding bone and the targeted orientation of the corresponding bone (e.g., based on the corresponding target animation data). In one embodiment, the bone orientations are defined by quaternion metrics, and the bone orientations may be stochastically adjusted. Taken in isolation, application of reinforcement learning will train the corresponding portion of the bone hierarchy for the trained animation character to have approximately the same motion as the target motion represented by the first target animation data (e.g., upper portion of body waving). As described more fully below, reinforcement learning may apply weighting and physics parameters of a simulation environment to modify the trained motion.

In addition, at each iteration of reinforcement learning the orientations of the bones in the second subset are adjusted concurrently according to corresponding reward metrics. This is accomplished key frame by key frame through the entire motion sequence. For example, the reward metric may be a distance metric (e.g., quaternion distance) between the trained orientation (e.g., associated with the current iteration) of a corresponding bone and the targeted orientation of the corresponding bone (e.g., based on the corresponding target animation data). In one embodiment, the bone orientations are defined by quaternions, and the bone orientations may be stochastically adjusted. Taken in isolation, application of reinforcement learning will train the corresponding portion of the bone hierarchy for the trained animation character to have approximately the same motion as the target motion represented by the second target animation data (e.g., lower portion of body running). As described more fully below, reinforcement learning may apply weighting and physics parameters of a simulation environment to modify the trained motion.

Further, the method includes compositing the first subset of bones with the second subset of bones at each iteration of reinforcement learning by applying physics parameters of a simulation environment. Physics is a set of constraints and forces applied after the action (positions) have been sent to the joint motors. These constraints and forces effect how the joints and character links actually move in the simulation. In other words if a wall is in the way and the joint motor attempts to move a link thru the wall, the wall will respond with a force and the character will be pushed backwards (assuming the wall was solid) instead of the link moving as originally intended. Put another way, the compositing operation provides compensating relative adjustments of the adjusted orientations of bones in the first and second subset of bones. In particular, the bone orientations are further compensated (e.g., additional adjustment to corresponding bone orientations) such that adjustments to the bone orientations of the first subset of bones are not allowed when they are inconsistent with adjustments to bone orientations, of the second subset of bones, and vice versa. For example, if an adjustment to a corresponding bone orientation is inconsistent, a compensating relative adjustment may be further applied to the adjusted orientation. As such, the first motion provided by the first target animation data (e.g., upper portion of a first target character waving) may be blended with a second motion provided by the second target animation data (e.g., lower portion of a second target character running) in a manner that is consistent with the physics parameters of the simulation environment.

In particular, the bone hierarchy of the trained character includes two or more subsets of bones, each of the subset of bones being animated through reinforcement learning using corresponding target animation data of a corresponding target character. The subsets of bones are interconnected, such that motion of a bone in one subset may affect the motion of a bone in another subset. For example, when a trained animation character (e.g., humanoid) is trained using two separate target animation data, the bone hierarchy of the trained character includes the first subset of bones trained by first target animation data (e.g., directed to the upper portion of the bone hierarchy—waving) and a second subset of bones trained by second target animation data (e.g., directed to the lower portion of the bone hierarchy—running) Each of the corresponding target characters has a specific target body motion as defined by the corresponding target animation data. In that manner, the trained character blends the disparate body motions associated with the two or more target animation data through reinforcement learning for a specific simulation environment. Weights may also be applied when blending and/or compositing the disparate body motions which will impact the calculated reward.

Reinforcement learning may also include the application of physics parameters of a simulation environment to the adjusted bone orientations of the bone hierarchy previously obtained. Deciding which bones need to be adjusted in the simulation environment and by how much may be accomplished using weights. That is, the adjustments of attempting two different target motions and de-emphasizing one of the motions may be implemented through weights. For example, weights being applied to the target animation data may specify which motion is being favored. In particular, all links and/or bones have a weight associated with them that specifies how important the link is with respect to all of the other links and/or bones in the bone hierarchy of the trained character. Thus, if the links and/or bones in the upper portion of the body are weighted higher than the links and/or bones in the lower portion of the body, the learned motion will attempt to match the upper body motion as closely as possible at the expense of not perfectly following the lower-body motion. During exploration in the RL training phase, the neural network will learn which motions are feasible to perform and which lead to failure. Thru this process the neural network will naturally learn to overcome instability by favoring movements which allow it to perform the motion.

Figure 3A:
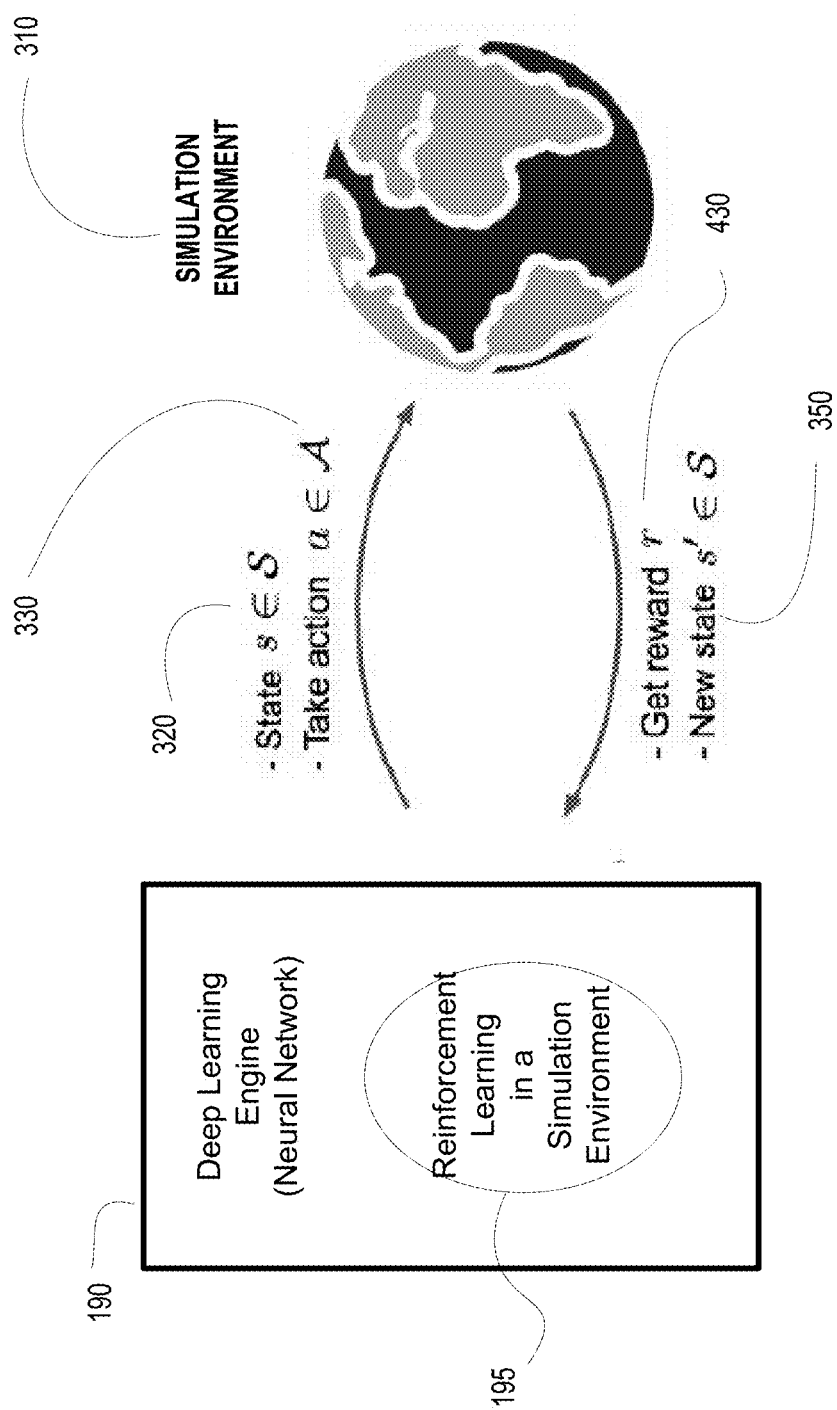
FIG. 3A is a workflow illustrating reinforcement learning to train an animation character using two or more target animation data having disparate target body motions, in accordance with one embodiment of the present disclosure.

FIG. 3A is a workflow illustrating reinforcement learning to train an animation character using two or more target animation data having disparate target body motions, in accordance with one embodiment of the present disclosure. The deep learning engine 190 receives as inputs a plurality of target animation data. For example, two separate animation data includes first animation data A (101*a*) (directed to the upper portion of the trained character having a waving motion) and second animation data B (101*b*) (directed to the lower portion of the trained character having a running motion). Mapping of the bones used for the plurality of target animation data may be mapped to a bone hierarchy of a trained animation character.

In addition, weights may be entered that indicates the importance of animation data in relation to other animation data. For example, the running motion of the second animation data B (101*b*) may be more favored than the first animation data A (101*a*), such that the second animation data B (101*b*) has a higher weight value, in one embodiment. In other embodiments, second animation data B (101*b*) may have a lower weight value to indicate that it is more favored than the first animation data A (101*a*) depending on how weights are used.

The trained character in simulation is driven thru joint motors, where a motor can be operated by specifying either a position (to move to), a velocity, or a torque. In one embodiment, positions are used to drive the joint motors, such as positions and/or orientations of bones, which can then be used to drive the joint positions specified by the joint motors. The neural network outputs a set of actions in the form of a position for each joint, which causes the corresponding joint motor to respond and the character to move.

For example, at each iteration of the reinforcement learning that is applied by reinforcement learning agent 195 of the deep learning engine 190, the current state 320 is determined along with a corresponding reward value. The current state 320 includes orientations for the each of the subset of bones of a bone hierarchy for the trained character, wherein each subset of bones is trained by a corresponding target animation data. In particular, for each key frame in a motion sequence, the current state 320 includes bone orientations for a pose of the trained animation character. This is done for each bone in the bone hierarchy of the trained animation character, wherein the bone hierarchy includes all of the subset of bones used for training. In one embodiment, the orientation of each bone is defined by a quaternion orientation. As a result, the current state 320 includes bone orientations of a bone hierarchy for each key frame in a motion sequence. For illustration, a motion sequence may have anywhere between 500 to 2000 key frames.

Each bone of the bone hierarchy may have a reward value. The reward value is a distance metric between an orientation of a corresponding bone as defined by the current state 320, and a target orientation of the same bone as defined by corresponding target animation data. The reward value may be computed after application of physics parameters and weights indicative of the simulation environment 310, as will be described below. In one embodiment, the distance metric is a quaternion distance that defines the angular distance between two quaternion metrics (e.g., measured in radians). The distance metric indicates how close the current state 320 of the trained orientation for the corresponding bone is to the target orientation. As a reward metric, the distance metric provides a criteria by which reinforcement learning can operate. In particular, reinforcement learning may try to reduce the distance metric over iterations of the reinforcement learning loop.

In one embodiment, bones in the bone hierarchy are defined by a direction (e.g., axis), instead of an orientation (axis and angle). In that case, reinforcement learning is applied to match bone directions between the current state 320 of a trained direction of a corresponding bone and the target direction of the bone defined by corresponding target animation data.

For each trained pose of the trained character and key frame in a motion sequence, based on the current state 320 of a trained orientation for the corresponding bone and its reward value, an action may be taken for that bone. As previously described, the neural network of the deep learning engine 190 outputs a set of actions in the form of a position for each joint, which causes the joint motor to respond and the trained character to move. This process is performed for each bone in a key frame (e.g., a corresponding pose), and repeated for each key frame in the motion sequence. The action may include a new bone orientation for the corresponding bone. The action may take into consideration that the goal is to continually reduce the reward value, such that the trained motion more closely follows the target motion at each iteration of the reinforcement learning. In one embodiment, the action is stochastically determined.

As shown in FIG. 3A, the bone orientations of the bone hierarchy of the trained character in the set of actions 330 is subject to physics parameters of the simulation environment 310, as previously described. More specifically, reinforcement learning includes the application of the physics parameters of a simulation environment to the adjusted bone orientations of the bone hierarchy previously obtained from the set of actions 330. As previously described, physics is a set of constraints and forces applied after the action (positions) have been sent to the joint motors. These constraints and forces effect how the joints and character links actually move in the simulation. In other words if a wall is in the way and the joint motor attempts to move a link through the wall, the wall will respond with a force and the character will be pushed backwards (assuming the wall was solid) instead of the link moving as originally intended. In that manner, the adjusted bone orientations are constrained by the physics parameters of the simulation environment 310. That is, a further compensating relative adjustment may be made to comply with the physics parameters, such that the bone orientations are constrained by the physics parameters of the simulation environment so that the trained animation character obeys the physics parameters. For example, if the trained orientation of a bone obtained from the first target animation data conflicts with or is inconsistent with the trained orientation of another bone obtained from the second target animation data, one or more of the orientations will be further compensated (applying a compensating relative adjustment) to comply with the physics parameters of the simulation environment. After physics is applied, the system measures the final state of the trained character (e.g., for the corresponding reinforcement learning iteration), and then uses this observation as the next input to the neural network of the deep learning engine 190.

A reward value for each bone may be determined based on the distance metric previously introduced. For example, the reward value is a distance metric between an orientation of a corresponding bone after application of the physics parameters of the simulation environment, and a target orientation of the same bone as defined by corresponding target animation data. The reward value is determined for each bone in the bone hierarchy for each key frame in the motion sequence.

Deciding which bones need to be adjusted and by how much may be accomplished using weights. For example, weights being applied to the target animation data may specify which motion is being favored. That is, weights provide for the adjustment of attempting to blend disparate target motions by de-emphasizing one or more of the target motions. In particular, all links and/or bones of a bone hierarchy have a weight associated with them that specifies how important that link is with respect to all of the other links and/or bones. Continuing with the illustration where two different target animation data is used to train the animation character, the running motion of the lower portion of the bone hierarchy trained using the first target animation data A (101a) may be favored over the waving motion of the upper portion of the bone hierarchy of the trained character that is trained using the second target animation data B (101b). For instance, the second target animation data (e.g., running) may be weighted more than the first target animation data. If links and/or bones in the upper portion of the body of the trained character is weighted higher than links and/or bones in the lower portion of the body of the trained character, the learned motion of the trained character will attempt to match the upper body motion as closely as possible at the expense of not perfectly following the lower-body motion. In that manner, the trained motion of the trained animation character will retain more of the running motion, and adjust the waving motion more heavily to comply with the physics parameters of the simulation environment. For example, the waving may be stunted or less pronounced so that the trained character retains balance given the simulation environment. Or, the upper portion of the bone hierarchy may go through a balancing motion in order to maintain balance while the lower portion continues running During exploration in the reinforcement learning training phase, the neural network will learn which motions are feasible to perform and which lead to failure. Through this process, the neural network will naturally learn to overcome instability by favoring movements which allow the trained character to perform the desired overall motion. That is, during the exploration phase of reinforcement learning (e.g., through one or more iterations), the disparate target motions are melded or blended, or composited together into one seamless motion for the trained character.

More specifically, the use of weighting in reinforcement learning may be applied to the reward value (e.g., distance metric) of bones for a corresponding pose (e.g., as defined in the set of actions 330) of the trained animation character in a corresponding key frame. Given the two separate target animation data example to train an animation character, the animation data for the upper portion of the bone hierarchy may be weighted in such a way to lessen its influence on the reward value. For example, on a scale between 0 and 1, where 1 is heavily favored, to deemphasize the influence of the upper portion of the bone hierarchy (e.g., that is waving), corresponding reward values (e.g., quaternion distance) may weighted with a low value (e.g., 0.25). Similarly, the animation data for the lower portion of the bone hierarchy may be weighted to increase its influence on the reward value. For example, to emphasize the influence of the lower portion of the bone hierarchy (e.g., that is running), corresponding reward values (e.g., quaternion distance) may be weighted with a higher value (e.g., 0.95). As such, even though a bone in the upper portion of the bone hierarchy eventually goes away from its target orientation (i.e., distance gets larger) in order to obey physics parameters of the simulation environment (e.g., deemphasize waving and emphasize running in bottom half), the reward value (e.g., quaternion distance) may stay very low because it is weighted properly, and may stay low for each reinforcement learning iteration.

In addition, an overall reward value for the entire motion sequence may be determined. For example, a distance metric is determined for each bone orientation in the bone hierarchy of the trained character for each key frame and corresponding pose in a motion sequence. For each key frame, a key frame sum of the distance metrics for the bones in the bone hierarchy may be determined. A total sum may be determined by summing the key frame sums of the key frames in the motion sequence. A motion sequence reward value 430 may be determined based on the total sum. In particular, as the total sum decreases, the motion sequence reward value 430 goes higher indicating a positive response for bone orientations. A higher reward value 430 indicates that the motion of the trained character is realistic for the given simulation environment 310.

After physics is applied, the final state of the trained character is measured (e.g., at each iteration of reinforcement learning). This observation is provided as the next input into the neural network (e.g., for the next iteration of reinforcement learning). In particular, the new set of states 350 of bone orientations for each key frame in a motion sequence may be input to the deep learning engine 190 for the next round of reinforcement learning as performed by the reinforcement learning agent 195. In one embodiment, another iteration of reinforcement learning is performed when the reward value 430 is changed (e.g., difference) from a previous reward value (e.g., from the previous reinforcement learning iteration) by over a threshold value. That is, it may be beneficial to perform another iteration of reinforcement learning. On the other hand, the iterations of reinforcement learning may end when the motion sequence reward values 430 between two or more iterations of reinforcement learning do not change by over the threshold value. That is, the changes to the bone orientations as determined through reinforcement learning minimally increases the reward value, such that the benefit obtained from another iteration of reinforcement learning is de minimus. As a result, once reinforcement learning ends the disparate target motions are melded or blended, or composited together into one seamless motion for the trained character.

Figure 3B:
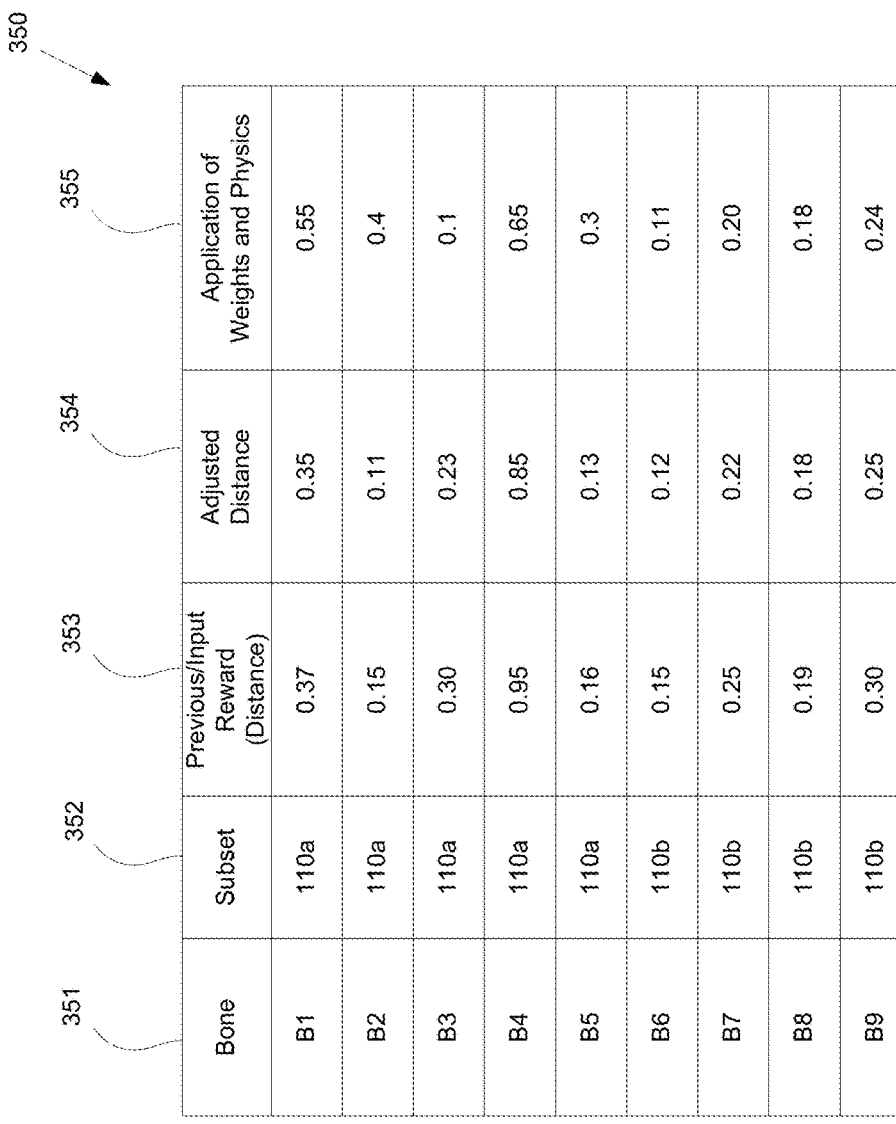
FIG. 3B illustrates a loop of reinforcement learning when training an animation character using two or more target animation data having disparate target body motions, in accordance with one embodiment of the present disclosure.

FIG. 3B illustrates a loop of reinforcement learning when training an animation character using two or more target animation data having disparate target body motions, in accordance with one embodiment of the present disclosure. A bone hierarchy 110 of a trained character 100 may include two subsets of bones, for purposes of illustration. It is understood that the bone hierarchy 110 may include two or more subsets of bones, each subset being trained by a corresponding target animation data. The first subset of bones 110a includes the upper portion of the bone hierarchy 110, such as the arms and torso. The first subset of bones 110a includes bones B1, B2, B3, B4, and B5. The first target animation data A (101a) represents the targeted motion used for training the first subset of bones 110a. A weight ($w_1$=0.4) may be applied to or associated with the first target animation data A (101a). The second subset of bones 110b includes the lower portion of the bone hierarchy 110, such as the waist and legs. The second subset of bones 110b includes bones B6, B7, B8, and B9. The second target animation data B (101b) represents the targeted motion used for training the second subset of bones 110b. A weight ($w_2$=0.9) may be applied to or associated with the second target animation data B (101b). In one embodiment, because the second target animation data B (101b) has a higher weight value than that for the first target animation data A (101a), the corresponding target motion (e.g., running) represented by the second target animation data B (101b) may be favored over the target motion (e.g., waving) represented by the first target animation data A (101a).

Table 350 includes information related to the bone hierarchy 110 for an iteration of reinforcement learning and for a specific pose of the trained animation character that corresponds to a key frame of a motion sequence. For example, column 351 indicates a bone identifier, and column 352 indicates which subset of bones each bone belongs to. For example, bones B1-B5 belong to the first subset of bones 110a. Bones B6-B9 belong to the second subset of bones 110b. Column 353 provides a previous reward value (e.g., from the last iteration of reinforcement learning as input to the reinforcement learning agent 195 of the deep learning engine 190) for each corresponding bone, wherein the reward value may indicate a quaternion distance between the current orientation of a corresponding bone and the target orientation of the bone as defined by the corresponding target animation data. For example, the reward value of 0.37 defines the quaternion distance for bone B1. Column 354 provides the adjusted distance for each bone of the bone hierarchy 110, wherein the adjusted distance is based on the adjusted orientation of the corresponding bone, as determined through reinforcement learning. In addition, column 355 applies physics parameters and weights to the adjusted orientations of each bone in the bone hierarchy, such as by applying corresponding compensating relative adjustments to the adjusted bone orientations.

For example, the second subset of bones 110b is favored over the first subset of bones 110a, as indicated by corresponding weights. In that manner, the running motion represented by the second animation data B (101b) is favored over the waving motion represented by the first animation data A (101a). As such, after application of physics parameters of the simulation environment and weighting, the bone orientations may be further compensated (e.g., applying compensating relative adjustments) from the values presented in column 354. Since the waving motion is deemphasized, the distances from the target motion (waving) may increase over time. This may be so that the trained animation character does not stumble while running and waving, such that the waving becomes stunted and thereby increasing corresponding distance metrics for each bone in the first subset of bones 110a. For example, the distance metrics for the first subset of bones 110a after application of the physics parameters of the simulation environment and weights as represented in column 355 may have large differences from the adjusted distances for the corresponding bones as represented in column 354 after application of a corresponding compensating relative adjustment, especially when compared to the second subset of bones 110b. For example, for bone B1, the adjusted distance in column 354 is 0.35, and after consideration of the simulation environment and weights, the distance in column 355 is 0.55—a difference of 0.2, which indicates a large change in bone orientation after application of a compensating relative adjustment. In comparison, because the running motion is favored, the distance metrics for the second subtle of bones 110b after application of the physics parameters of the simulation environment and weights as represented in column 355 may have small differences from the adjusted distances for the corresponding bones as represented in column 354 after application of a corresponding compensating relative adjustment, especially when compared to the first subset of bones 110a. For example, for bone B6, the adjusted distance in column 354 is 0.12, and after consideration of the simulation environment and weights, the distance in column 355 is 0.11—a difference of 0.01, which indicates a small change in bone orientation when considering for the simulation environment and weighting.

Figure 4A:
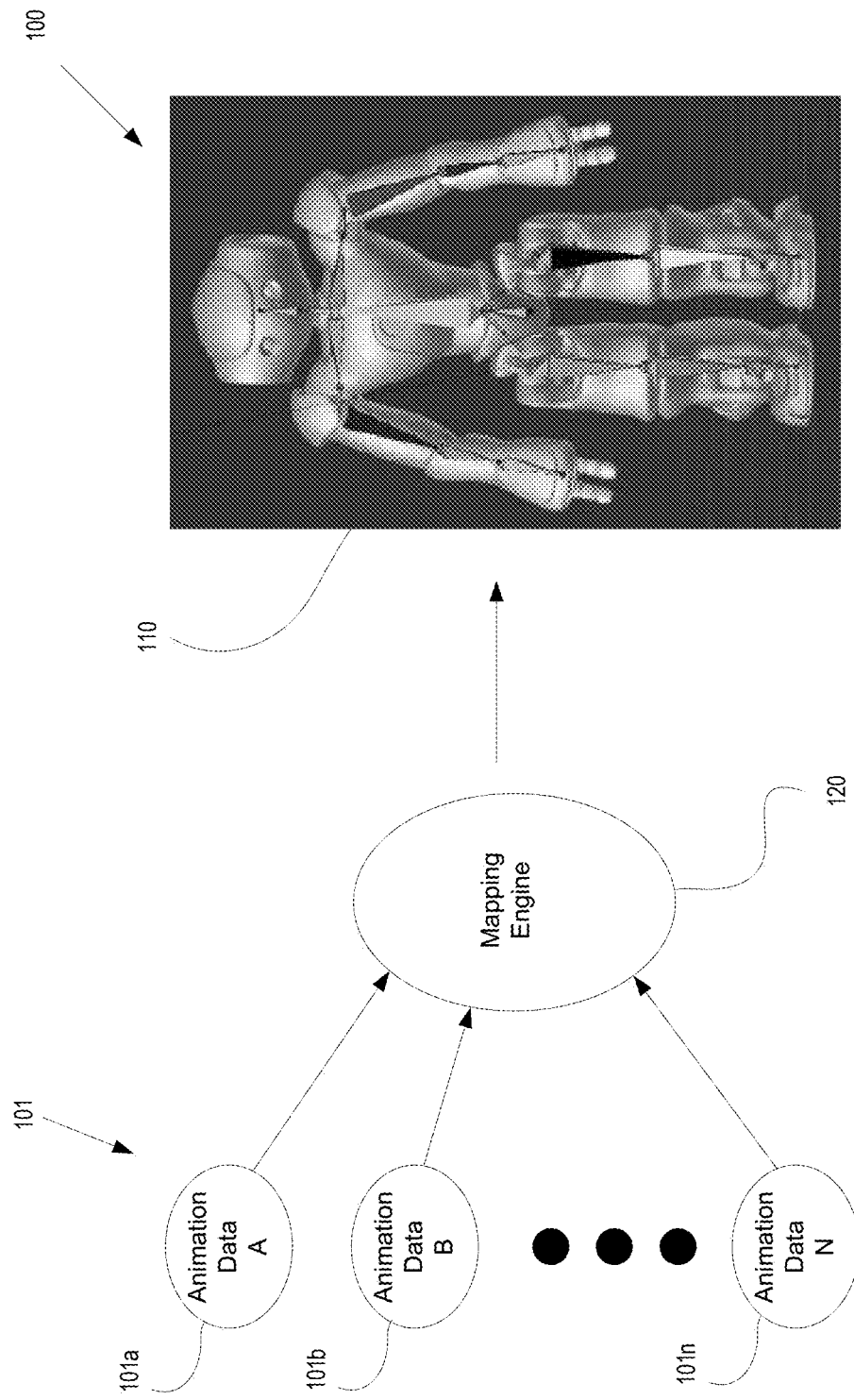
FIG. 4A illustrates mapping of two or more target animation data to different parts of a bone hierarchy of a trained animation character, wherein the two or more target animation data have disparate target body motions, in accordance with one embodiment of the present disclosure.

FIG. 4A illustrates mapping of two or more target animation data to different parts of a bone hierarchy of a trained animation character, wherein the two or more target animation data have disparate target body motions, in accordance with one embodiment of the present disclosure. In particular, the plurality of target animation data 101 is provided as input to the mapping engine 120. Each of the target animation data is used to train a corresponding subset of bones in the bone hierarchy 110 of the trained character 100 (e.g., a humanoid). For example, training using two animation data having disparate motions may include a first animation data A (101a) representing a target motion (e.g., waving) for an upper portion of a bone hierarchy and second animation data B (101b) representing a target motion for a lower portion of the bone hierarchy (e g , running), as previously introduced.

Figure 4B:
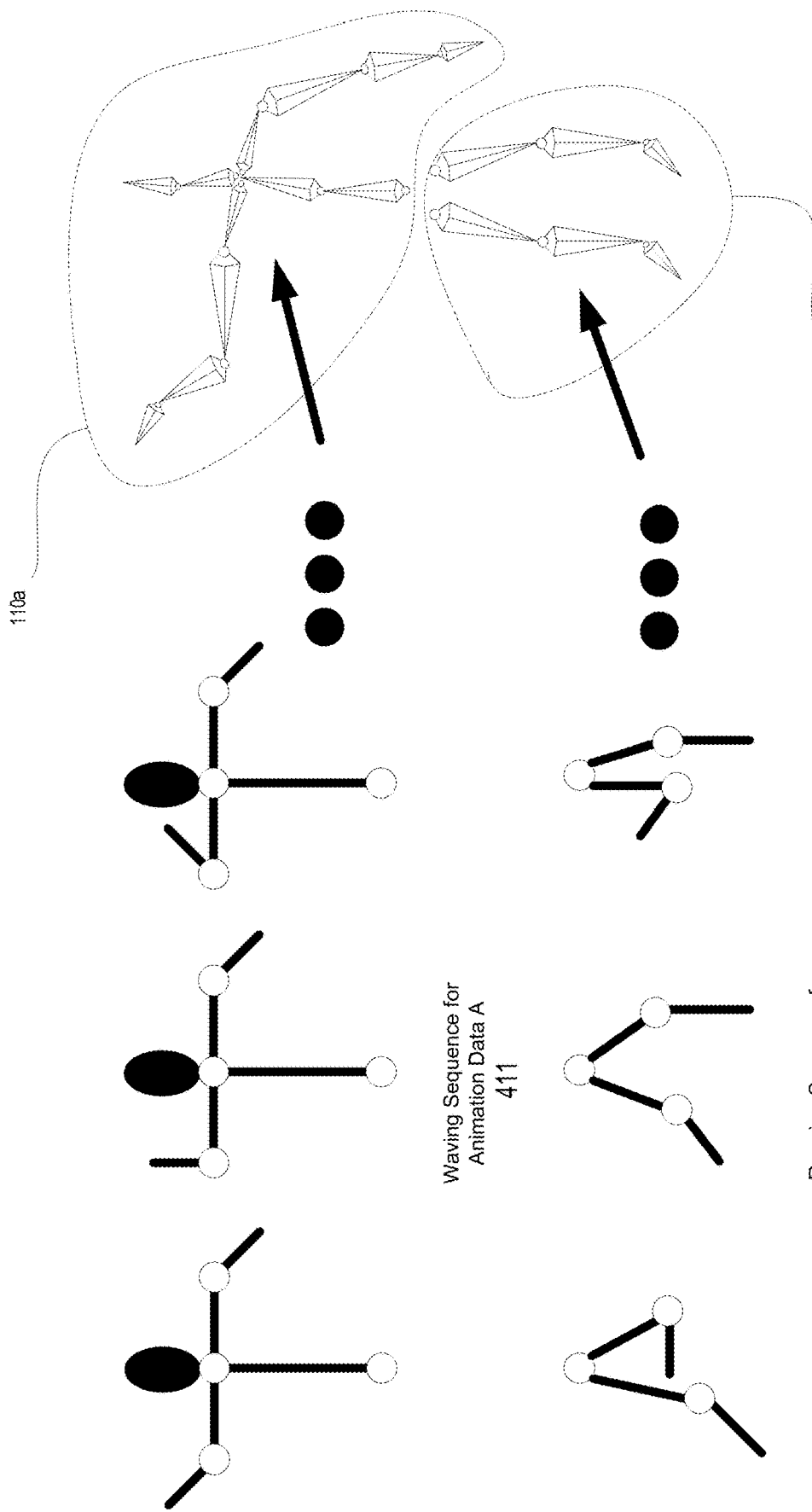
FIG. 4B illustrates the training of an animation character with reinforcement learning using two separate target animation data having disparate target body motions, in accordance with one embodiment of the present disclosure.

FIG. 4B illustrates the training of an animation character 100 with reinforcement learning using two separate target animation data having disparate target body motions, in accordance with one embodiment of the present disclosure. The animation character 100 is represented by the bone hierarchy 110. Continuing with the example, training of the bone hierarchy may be performed using two animation data. In particular, the first animation data A (101a) is used to train the first subset of bones 110a, and the second animation data B (101b) is used to train the second subset of bones 110b.

The first animation data A (101a) represents a waving motion sequence 411 particular to the arms and torso of a target character. The waving motion sequence 411 is used to train the first subset of bones 110a of the bone hierarchy of the trained character 100. That is, the waving motion is transferred to the trained character 100, and more specifically to the arms and torso of the trained character 100.

In addition, the second animation data B (101b) represents a running motion sequence 412 particular to the waist and legs of a corresponding target character. The running motion sequence 412 is used to train the second subset of bones 110b of the bone hierarchy of the trained character 100. That is, the running motion is transferred to the trained character 100, and more specifically to the waist and legs of the trained character 100.

Figure 4C:
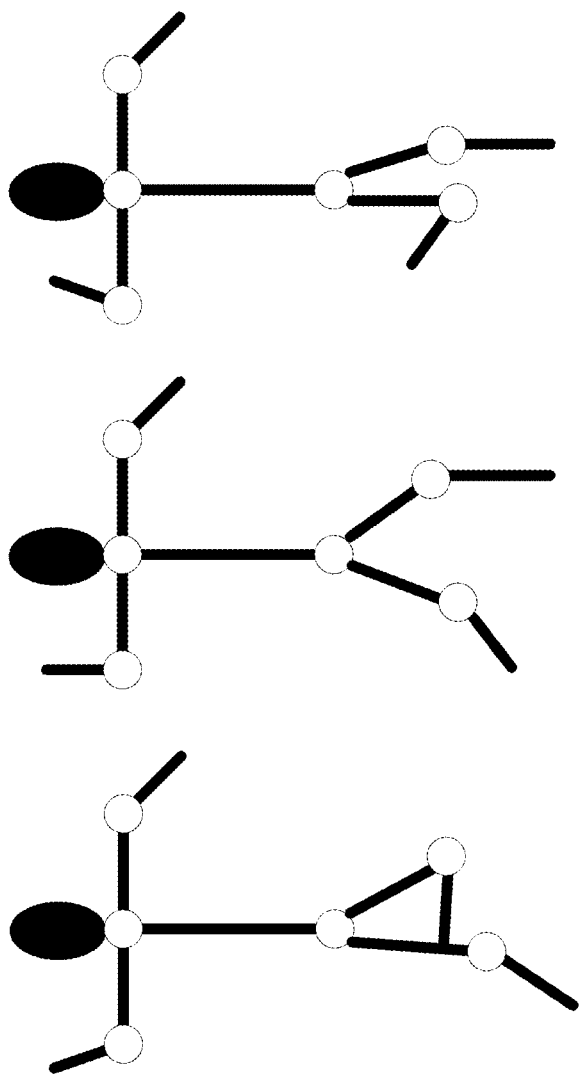
FIG. 4C illustrates the blending of the two separate target animation data having disparate target body motions for a trained animation character, wherein the trained body motions may be modified from the target body motions after application of physics parameters of a simulation environment and weighting, in accordance with one embodiment of the present disclosure.

FIG. 4C illustrates the blending of the two separate target animation data of FIG. 4A having disparate target body motions for a trained animation character, wherein the trained body motion may be modified from the target body motions after application of physics parameters of a simulation environment and weighting, in accordance with one embodiment of the present disclosure. In particular, the motion sequence 413 of the trained animation character 100 blends the waving motion sequence 411 represented by target animation data A (101a) with the running motion sequence 412 represented by target animation data B (101b). Because the running motion sequence 412 is favored over the waving motion sequence 411 (e.g., through weighting), the motion of the trained animation character 100 retains more of the running motion while sacrificing the waving motion, especially when considering the simulation environment and weights. For example, the motion sequence 413 may retain most of the running motion from target animation data B (101b), but stunts the waving motion from target animation data A (101a). As shown, the motion sequence 413 shown in FIG. 4C shows limited arm motion when waving (e.g., arm motion travels about 20 degrees) when compared to the aggressive waving motion sequence 411 shown in FIG. 4B used for training (e.g., arm motion travels about 40 degrees).

Figure 5:
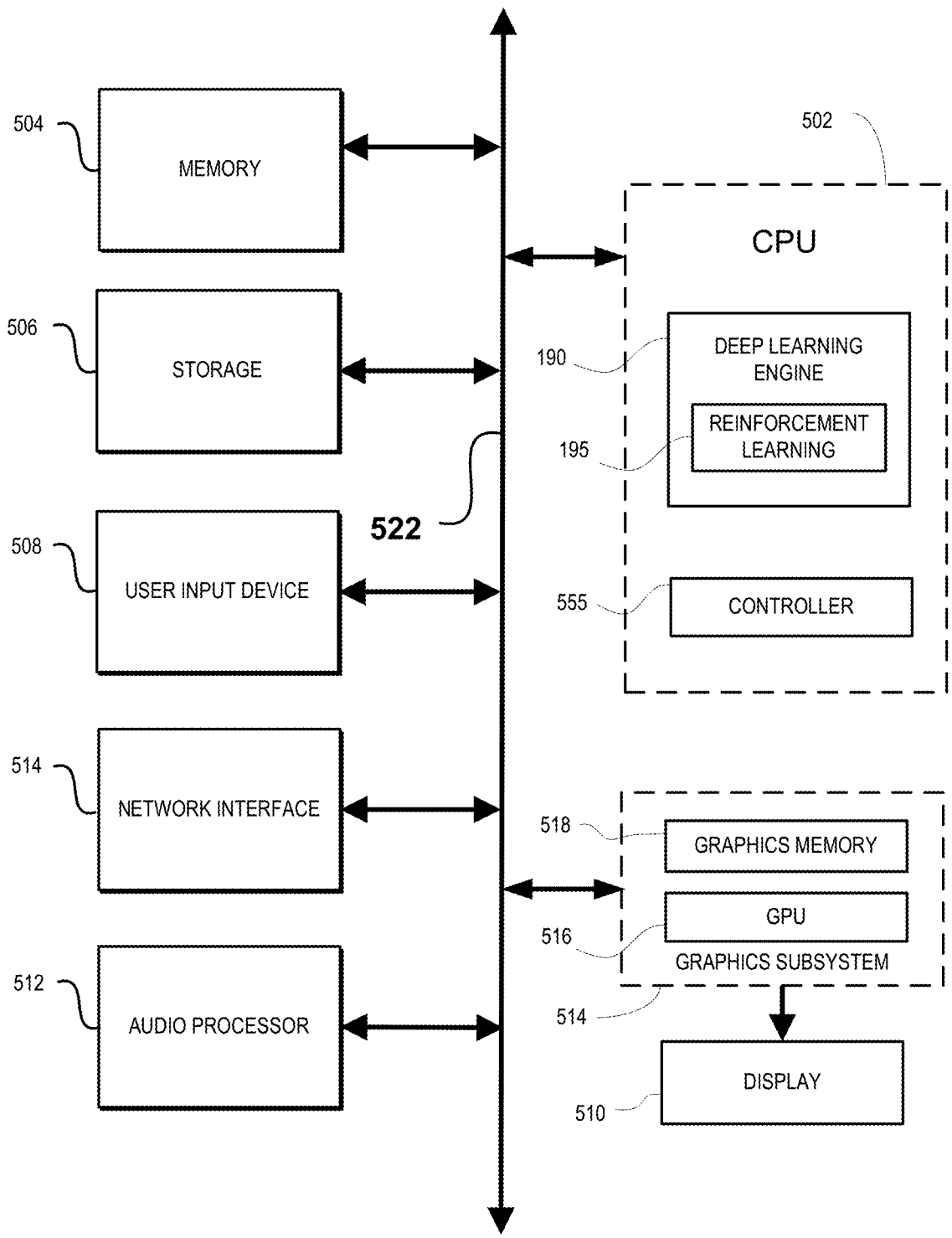
FIG. 5 illustrates components of an example device that can be used to perform aspects of the various embodiments of the present disclosure.

FIG. 5 illustrates components of an example device 500 that can be used to perform aspects of the various embodiments of the present disclosure. For example, FIG. 5 illustrates an exemplary hardware system suitable for training an AI model that is capable of performing various functionalities in relation to development of a gaming application, including training an animation character using two or more target animation data having disparate target body motions, in accordance with one embodiment of the present disclosure. This block diagram illustrates a device 500 that can incorporate or can be a personal computer, a server computer, gaming console, mobile device, or other digital device, each of which is suitable for practicing an embodiment of the invention. Device 500 includes a central processing unit (CPU) 502 for running software applications and optionally an operating system. CPU 502 may be comprised of one or more homogeneous or heterogeneous processing cores.

In accordance with various embodiments, CPU 502 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, limb training, animation character trained using, and user classifications. For example, CPU 502 may be configured to include the AI engine (e.g., deep learning) 190 that is configured to support and/or perform learning operations with regards to providing various functionalities, such as training an animation character using two or more target animation data having disparate target body motions. The deep leaning engine may include apply reinforcement learning with reinforcement learning agent 195 to train the animation character.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 514 is further connected with data bus 522 and the components of the device 500. The graphics subsystem 514 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within AI engine 190 to provide additional processing power, such as for the AI or deep learning functionality.

The graphics subsystem 514 periodically outputs pixel data for an image from graphics memory 518 to be displayed on display device 510, or to be projected by projection system 540. Display device 510 can be any device capable of displaying visual information in response to a signal from the device 500, including CRT, LCD, plasma, and OLED displays. Device 500 can provide the display device 510 with an analog or digital signal, for example.

Accordingly, the present disclosure described systems and methods implementing deep learning (also referred to as machine learning) techniques to build an AI model using training data collected from a network of servers executing instances of a gaming application supporting one or more game plays, and for using the trained AI model to provide various functionalities relating to the gaming application and/or game plays of the gaming application, in various embodiments.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for training an animation character for use in animation, comprising:
   mapping first animation data to a first subset of bones of a trained character, wherein the first animation data defines a first target motion sequence;
   mapping second animation data to a second subset of bones of the trained character, wherein a bone hierarchy of the trained character includes the first subset of bones and the second subset of bones, wherein the second animation data defines a second target motion sequence; and
   applying reinforcement learning over a plurality of iterations for training the first subset of bones using the first animation data and for training the second subset of bones using the second animation data, wherein training of the first subset of bones and the second subset of bones is performed concurrently at each iteration, and wherein the training the first subset of bones and the second subset of bones includes adjusting orientations of bones in the first subset of bones and the second subset of bones, wherein the first subset of bones is composited with the second subset of bones at each iteration of the reinforcement learning by applying physics parameters of a simulation environment to the orientations of bones in the first subset of bones and the second subset of bones that are adjusted.

2. The method of claim 1, wherein the adjusting orientations of bones includes:
   automatically adjusting joint parameters of a plurality of joints of bones in the hierarchy of bones in response to resultant orientations for the first subset of bones and the second subset of bones.

3. The method of claim 1,
   wherein the first target motion sequence is from a first target character and the second target motion sequence is from a second target character,
   wherein the first target motion sequence and the second target motion sequence define disparate motions, and
   wherein a trained motion sequence of the trained character blends the first target motion sequence and the second target motion sequence.

4. The method of claim 1, wherein the applying reinforcement learning for training the first subset of bones and the second subset of bones includes:
   for each bone in the bone hierarchy, determining a distance metric between a trained position for a corresponding bone in a frame and a target position for the corresponding bone in the frame; and
   stochastically adjusting the trained position to minimize the distance metric.

5. The method of claim 4, further comprising:
   for each bone in the bone hierarchy of the frame, determining an adjusted distance metric between an adjusted trained position and the target position for the corresponding bone in the frame; and
   summing adjusted distance metrics for bones in the bone hierarchy for a plurality of frames of a trained motion sequence to determine a reward value.

6. The method of claim 5, further comprising:
performing a next iteration of the reinforcement learning to train the first subset of bones and the second subset of bones when the reward value does not meet a threshold; and
halting the reinforcement learning when the reward value meets the threshold.

7. The method of claim 4, further comprising:
applying a first weight to the distance metric of the corresponding bone included within the first subset of bones; and
applying a second weight to the distance metric of the corresponding bone included within the second subset of bones.

8. A non-transitory computer-readable medium storing a computer program for training an animation character for use in animation, the computer-readable medium comprising:
program instructions for mapping first animation data to a first subset of bones of a trained character, wherein the first animation data defines a first target motion sequence;
program instructions for mapping second animation data to a second subset of bones of the trained character, wherein a bone hierarchy of the trained character includes the first subset of bones and the second subset of bones, wherein the second animation data defines a second target motion sequence; and
program instructions for applying reinforcement learning over a plurality of iterations for training the first subset of bones using the first animation data and for training the second subset of bones using the second animation data, wherein training of the first subset of bones and the second subset of bones is performed concurrently at each iteration, and wherein the training the first subset of bone and the second subset of bones includes adjusting orientations of bones in the first subset of bones and the second subset of bones, wherein the first subset of bones is composited with the second subset of bones at each iteration of the reinforcement learning by applying physics parameters of a simulation environment to the orientations of bones in the first subset of bones and the second subset of bones that are adjusted.

9. The non-transitory computer-readable medium of claim 8, wherein the program instructions for adjusting orientations of bones includes:
program instructions for automatically adjusting joint parameters of a plurality of joints of bones in the hierarchy of bones in response to resultant orientations for the first subset of bones and the second subset of bones.

10. The non-transitory computer-readable medium of claim 8,
wherein the first target motion sequence is from a first target character and the second target motion sequence is from a second target character,
wherein the first target motion sequence and the second target motion sequence define disparate motions, and
wherein a trained motion sequence of the trained character blends the first target motion sequence and the second target motion sequence.

11. The non-transitory computer-readable medium of claim 8, wherein the applying reinforcement learning for training the first subset of bones and the second subset of bones includes:
for each bone in the bone hierarchy, determining a distance metric between a trained position for a corresponding bone in a frame and a target position for the corresponding bone in the frame; and
stochastically adjusting the trained position to minimize the distance metric.

12. The non-transitory computer-readable medium of claim 11, further comprising:
for each bone in the bone hierarchy of the frame, determining an adjusted distance metric between an adjusted trained position and the target position for the corresponding bone in the frame; and
summing adjusted distance metrics for bones in the bone hierarchy for a plurality of frames of a trained motion sequence to determine a reward value.

13. The non-transitory computer-readable medium of claim 12, further comprising:
performing a next iteration of the reinforcement learning to train the first subset of bones and the second subset of bones when the reward value does not meet a threshold; and
halting the reinforcement learning when the reward value meets the threshold.

14. The method of claim 11, further comprising:
applying a first weight to the distance metric of the corresponding bone included within the first subset of bones; and
applying a second weight to the distance metric of the corresponding bone included within the second subset of bones.

15. A computer system comprising:
a processor; and
memory coupled to the processor and having stored therein instructions that, if executed by the computer system, cause the computer system to execute a method for training an animation character for use in animation comprising:
mapping first animation data to a first subset of bones of a trained character, wherein the first animation data defines a first target motion sequence;
mapping second animation data to a second subset of bones of the trained character, wherein a bone hierarchy of the trained character includes the first subset of bones and the second subset of bones, wherein the second animation data defines a second target motion sequence; and
applying reinforcement learning over a plurality of iterations for training the first subset of bones using the first animation data and for training the second subset of bones using the second animation data, wherein training of the first subset of bones and the second subset of bones is performed concurrently at each iteration, and wherein the training the first subset of bones and the second subset of bones includes adjusting orientations of bones in the first subset of bones and the second subset of bones, wherein the first subset of bones is composited with the second subset of bones at each iteration of the reinforcement learning by applying physics parameters of a simulation environment to the orientations of bones in the first subset of bones and the second subset of bones that are adjusted.

16. The computer system of claim 15, wherein in the method the adjusting orientations of bones includes:
automatically adjusting joint parameters of a plurality of joints of bones in the hierarchy of bones in response to resultant orientations for the first subset of bones and the second subset of bones.

17. The computer system of claim 15, wherein the applying reinforcement learning for training the first subset of bones and the second subset of bones includes:
- for each bone in the bone hierarchy, determining a distance metric between a trained position for a corresponding bone in a frame and a target position for the corresponding bone in the frame; and
- stochastically adjusting the trained position to minimize the distance metric,
- wherein the first target motion sequence is from a first target character and the second target motion sequence is from a second target character,
- wherein the first target motion sequence and the second target motion sequence define disparate motions,
- wherein a trained motion sequence of the trained character blends the first target motion sequence and the second target motion sequence.

18. The computer system of claim 17, the method further comprising:
- for each bone in the bone hierarchy of the frame, determining an adjusted distance metric between an adjusted trained position and a the target position for the corresponding bone in the frame; and
- summing adjusted distance metrics for bones in the bone hierarchy for a plurality of frames of a trained motion sequence to determine a reward value.

19. The computer system of claim 18, the method further comprising:
- performing a next iteration of the reinforcement learning to train the first subset of bones and the second subset of bones when the reward value does not meet a threshold; and
- halting the reinforcement learning when the reward value meets the threshold.

20. The computer system of claim 17, the method further comprising:
- applying a first weight to the distance metric of the corresponding bone included within the first subset of bones; and
- applying a second weight to the distance metric of the corresponding bone included within the second subset of bones.

* * * * *